(12) United States Patent
Mukherjee et al.

(10) Patent No.: US 11,114,975 B2
(45) Date of Patent: Sep. 7, 2021

(54) SOLAR TRACKING SYSTEM

(71) Applicant: Varun Sachar, New Delhi (IN)

(72) Inventors: Sudipto Mukherjee, New Delhi (IN); Jitendra Prasad Khatait, New Delhi (IN); Nilanjan Sen, New Delhi (IN)

(73) Assignee: Varun Sachar, New Delhi (IN)

( * ) Notice: Subject to any disclaimer, the term of this patent is extended or adjusted under 35 U.S.C. 154(b) by 0 days.

(21) Appl. No.: 16/968,694

(22) PCT Filed: Apr. 3, 2019

(86) PCT No.: PCT/IN2019/050273
§ 371 (c)(1),
(2) Date: Aug. 10, 2020

(87) PCT Pub. No.: WO2019/224834
PCT Pub. Date: Nov. 28, 2019

(65) Prior Publication Data
US 2021/0067086 A1   Mar. 4, 2021

(30) Foreign Application Priority Data
May 21, 2018 (IN) .............................. 201811019035

(51) Int. Cl.
*H02S 20/32* (2014.01)
*H02S 30/10* (2014.01)
*G05D 3/10* (2006.01)

(52) U.S. Cl.
CPC ............. *H02S 20/32* (2014.12); *G05D 3/105* (2013.01); *H02S 30/10* (2014.12)

(58) Field of Classification Search
CPC .......... H02S 20/32; H02S 30/10; G05D 3/105
See application file for complete search history.

(56) References Cited

U.S. PATENT DOCUMENTS

| 8,119,963 B2* | 2/2012 | Scanlon | F24S 25/632 |
| | | | 250/203.4 |
| 8,459,249 B2* | 6/2013 | Corio | H02S 20/32 |
| | | | 126/600 |
| 2018/0091088 A1* | 3/2018 | Barton | F16H 19/001 |

* cited by examiner

*Primary Examiner* — Jayne L Mershon
(74) *Attorney, Agent, or Firm* — Mark M. Friedman

(57) ABSTRACT

The present invention relates to a two axis tracking system (100). The present invention includes a frame (102), a solar panel PV module (112), an upper beam (114), a selectively flexible bracket (116), a first supporting pillar (118), a second supporting pillar (140), a lower beam (120), first strut (126), a second strut (146). The first supporting pillar (118) and the second supporting pillar (140) together act as the fixed link. The frame (102) acts as the rotating link and the lower beam (120) acts as the translating link. The first strut (126) and the second strut (146) together act as the fourth link connecting the frame (102) and the lower beam (120). The translation of the lower beam (120) causes rotation of the frame (102) in north-south direction. The PV module (112) is mounted on the frame (102) are rotated in east-west direction by translation motion of the upper beam (114).

9 Claims, 4 Drawing Sheets

SOLAR TRACKING SYSTEM

FIELD OF THE INVENTION

The present invention relates to a tracking system for the PV module to track sun rays. More particularly present invention relates to system and method for tracking daily and seasonal movement of the sun.

BACKGROUND

With the rapid expansion of the world, its population and the world economies, the energy demand has rapidly increased. According to International Energy Agency (IEA), the world energy consumption for 2015 was 109,136 TWh. With such huge energy consumption, relying only on fossil fuels for energy supply is a numb thinking. The carbon emissions for fossil fuels are one of the primary contributors for global warming. Thus, there is a dire need for alternative energy sources for curbing the world energy demand. One such renewable, eco-friendly and economically feasible energy source is solar energy. This abundant source can be accessed almost anywhere in the world. One of the principle factors affecting the power output of solar energy is the intensity of sun rays. It is said "One hour of solar energy is enough to meet the energy demand of entire earth's population for one year". The more intensity of sun rays falling on per square inch area of PV module will lead to greater production of power output. As the position of sun changes relative to the position of the earth, the angle at which the sun rays hit the surface of PV module changes. This will lead to varied sun intensity and will lower power output. For maximum intensity of sun rays, the PV modules should face towards the sun directly. In traditional fixed type PV modules, this is unachievable. Thus, there arises a need for a system which tracks the path of sun as it changes its position during the day and maintains the sun intensity required for maximum power generation. Some solar tracker systems typically follow the motion of the sun from East to West on a daily basis. These are known as "horizontal or tilted single-axis" trackers. Thus, they are able to extract more power compared to a fixed system. Dual axis trackers have recently become more popular and improve efficiency by enabling seasonal North-South tracking in addition to the East-West tracking. Broadly their design follows the same principle for East-West tracking ("single-axis polar-mount" or "parallel-kinematic") while an additional actuator directly attached between the rotating frame and its supporting vertical pillar rotates the frame in the North-South direction. The "dual-axis polar-mount" tracker, can only support a limited number of arrays per actuated frame.

U.S. Pat. No. 8,459,249B2 discloses a solar tracking system with a torque tube supporting s. Columns support the system and have bearings for rotation of the torque tube. A drive is coupled to the torque tube and is driven by a gearbox, such as a worm gear assembly, for rotating the array of s to follow the sun's diurnal motion. The array can rotate in an opposite direction, or backtrack, to prevent shadowing from one module row to another. Multiple gearboxes can be mechanically linked by drive shafts and driven by a single motor. The drive shafts may incorporate universal joints for uneven terrain or staggered configurations. Harmonic dampers can be affixed to the s to decouple wind forces which allow the use of larger s.

US 20070215199 discloses a two-axis solar tracker is capable of withstanding extreme weather conditions. The solar tracker includes a solar array, a frame, a base, a pivot frame, and a first and second actuator. The solar array is mounted to the frame and captures sunlight. The base is pivotally connected to the frame and defines a pivot axis for elevational movement of the solar array. The pivot frame is also pivotally connected to the frame and defines a pivot axis for azimuthal movement of the solar array. The first actuator controls elevational movement of the solar array and the second actuator controls azimuthal movement of the solar array. The solar tracker is pivotable between a raised position and a stowed position.

In the prior art, the existing invention restricts the tracking only to daily movement of the sun and not seasonal shifts. The existing inventions are too complex with unnecessary complications. The existing Inventions are unable to transmit the linear motion of the actuators over large distances. The present invention provides solar tracking without having the problems in the prior art. Thus, there is a need for the present invention.

OBJECTIVE

The main objective of the present invention is to assemble a system for sun rays tracking for PV module.

The principal objective of the present invention is to develop a system for tracking sun rays on seasonal and daily basis.

Another objective of the present invention is that present invention should be easily assembled.

Yet another objective of the present invention is to use less force in order to move large numbers of PV modules and frames.

Yet another objective of the present invention is to reduce the cost of operation as well as manufacturing cost of the present invention.

Yet another objective of the present invention is to reduce the repairing time as well as repairing cost.

Yet another objective of the present invention is that the present invention should be resistance to large wind force.

Yet another objective of the present invention is that the present invention should be easily transported to any remote location.

Yet another objective of the present invention is to use minimum number of power drive to move the panels and frames.

Further objectives, advantages and features of the present invention will become apparent from the detailed description provided herein below, in which various embodiments of the disclosed invention are illustrated by way of example and with appropriate reference to accompanying drawings.

SUMMARY OF THE PRESENT INVENTION

The present invention relates to a two axis solar tracker system. The present invention includes a frame, a frame side one bearing, a frame side two bearing, a PV module, an upper beam, a selectively flexible bracket, a first supporting pillar, a second supporting pillar, a lower beam, a first supporting pillar bearing, a second supporting pillar bearing, a first strut, a second strut, a upper beam actuator and a lower beam actuator. The frame includes a frame side one, a frame side two, a first cross beam, and a second cross beam. The frame side two is parallel to the frame side one. The first cross beam is connected between the frame side two and the frame side one perpendicularly. The second cross beam is connected between the frame side two and the frame side one, and is parallel to the first cross beam. The frame side one bearing is connected to the frame side one. The frame side two bearing is connected to the frame side two exactly opposite to the frame side one bearing. The PV module is coupled to the frame side one bearing on the frame side one and further coupled to the frame side two bearing on the frame side two. The upper beam is below to the frame side one. The selectively flexible bracket is connected between the upper beam and the frame side one bearing. The lower beam forms a perpendicular sliding pair with the first supporting pillar and the second supporting pillar. The first supporting pillar bearing is connected between the first supporting pillar and the first cross beam. The second supporting pillar bearing is connected between the second supporting pillar and the second cross beam. The first Strut is connected between the first cross beam and the lower beam through a first spherical joint and a second spherical joint. The second strut is connected between the second cross beam and the lower beam through a third spherical joint and a fourth spherical joint. The upper beam actuator is connected to the upper beam at one end and further connected to the first cross beam at the other end. The lower beam actuator is connected to the lower beam at one end and connected to the first supporting pillar at the other end. Herein, the first spherical joint connects one end of the first strut and the first cross beam and the second spherical joint connects another opposite end of the first strut and the lower beam. Herein, the third spherical joint connects one end of the second strut and the second cross beam and the fourth spherical joint connects another opposite end of the second strut and the lower beam.

The translation of the lower beam causes rotation of the frame in north-south direction. The PV module is mounted on the frame are rotated in east-west direction by the upper beam.

In an embodiment, the present invention relates to a method of two axis solar tracker system, the method includes: a method of rotating the PV module and a method of rotating the frame, the method of rotating the PV module includes: a force is applied on the upper beam in the direction along the length of the frame side one; the upper beam moves in the direction of applied force; the force from the upper beam transfers to the selectively flexible bracket; the selectively flexible bracket moves to transfer the force applied to a frame side one bearing; the frame side one bearing uses the force applied to rotate; and rotation of the frame side one bearing rotates the PV module; herein the force applied is through the upper beam actuator. The method of rotating the frame includes force is applied on the lower beam in the direction parallel to frame side two; the lower beam moves in the direction of the force applied; the force from lower beam transfers to the first strut and the second strut; the position of the first strut and the second strut is adjusted by the force applied with the help of a first spherical joint, a second spherical joint, a third spherical joint and a fourth spherical joint; the force from the first strut and the second strut is transferred to the frame; and the angle of rotation of frame is changed depending on the force applied; herein the force applied is through a lower beam actuator.

One of the advantages of the present invention is that the present invention tracks sun rays on seasonal and daily basis.

Yet another advantage of the present invention is that the present invention is easy to assemble.

Yet another advantage of the present invention is that the present invention reduces the repairing time.

Yet another advantage of the present invention is that the present invention is easily transported and installed on any remote location.

Further objectives, advantages and features of the present invention will become apparent from the detailed description provided herein below, in which various embodiments of the disclosed invention are illustrated by way of example and appropriate reference to an accompanying drawings.

BRIEF DESCRIPTION OF THE DRAWINGS

The accompanying drawings are incorporated in and constitute a part of this specification to provide a further understanding of the invention. The drawings illustrate one embodiment of the invention and together with the description, serve to explain the principles of the invention.

DETAILED DESCRIPTION OF THE INVENTION

Figure 1:
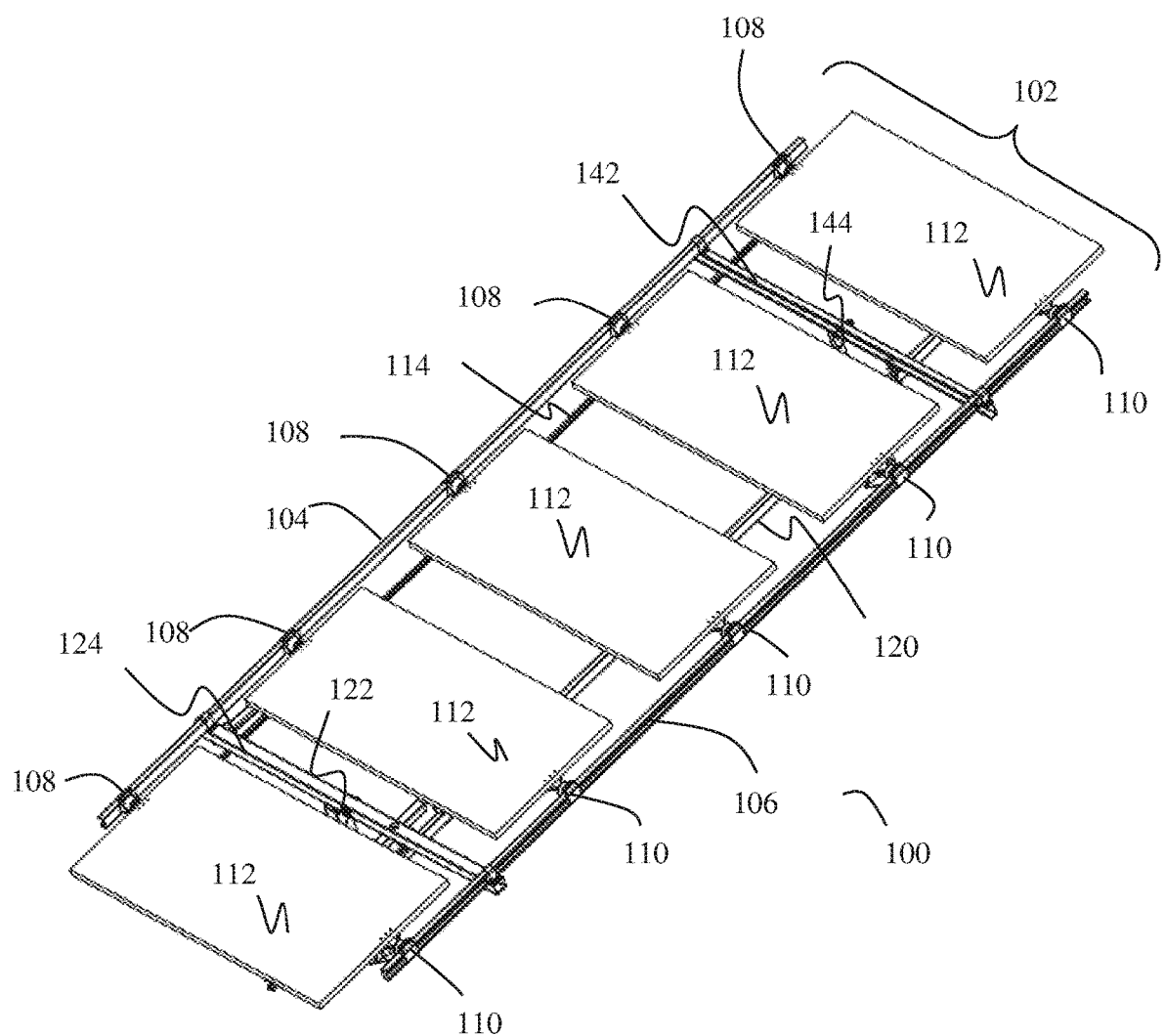
FIG. 1 illustrates a top view of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definition

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended. The term "comprising" is used interchangeably used by the terms "having" or "containing".

Reference throughout this document to "one embodiment", "certain embodiments", "an embodiment", "another embodiment", and "yet another embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics are combined in any suitable manner in one or more embodiments without limitation.

FIG. 1 illustrates the top view of the system (100). The system (100) includes a frame (102), a frame side one bearing (108), a frame side two bearing (110), a PV module (112), an upper beam (114), a lower beam (120), a first supporting pillar bearing (122), a second supporting pillar bearing (144). The frame (102) includes a frame side one (104), a frame side two (106), a first cross beam (124), a second cross beam (142). The frame side two (106) is parallel to the frame side one (104). The first cross beam (124) is connected between the frame side two (106) and the frame side one (104) perpendicularly. The second cross beam (142) is connected between the frame side two (106) and the frame side one (104), and is parallel to the first cross beam (124). The frame side one bearing (108) is connected to the frame side one (104). The frame side two bearing (110) is connected to the frame side two (106) exactly opposite to the frame side one bearing (108). The PV module (112) is coupled to the frame side one bearing (108) on the frame side one (104) and further coupled to the frame side two bearing (110) on the frame side two (106). The upper beam (114) is below to the frame side one (104). The selectively flexible bracket (116) (shown in FIG. 2) is connected between the upper beam (114) and the frame side one bearing (108). The lower beam (120) forms a perpendicular sliding pair with the first supporting pillar (118) and the second supporting pillar (140) (shown in FIG. 2). The first supporting pillar bearing (122) is connected between the first supporting pillar (118) (shown in FIG. 2) and the first cross beam (124). The second supporting pillar bearing (144) is connected between the second supporting pillar (140) (shown in FIG. 2) and the second cross beam (142).

Figure 2:
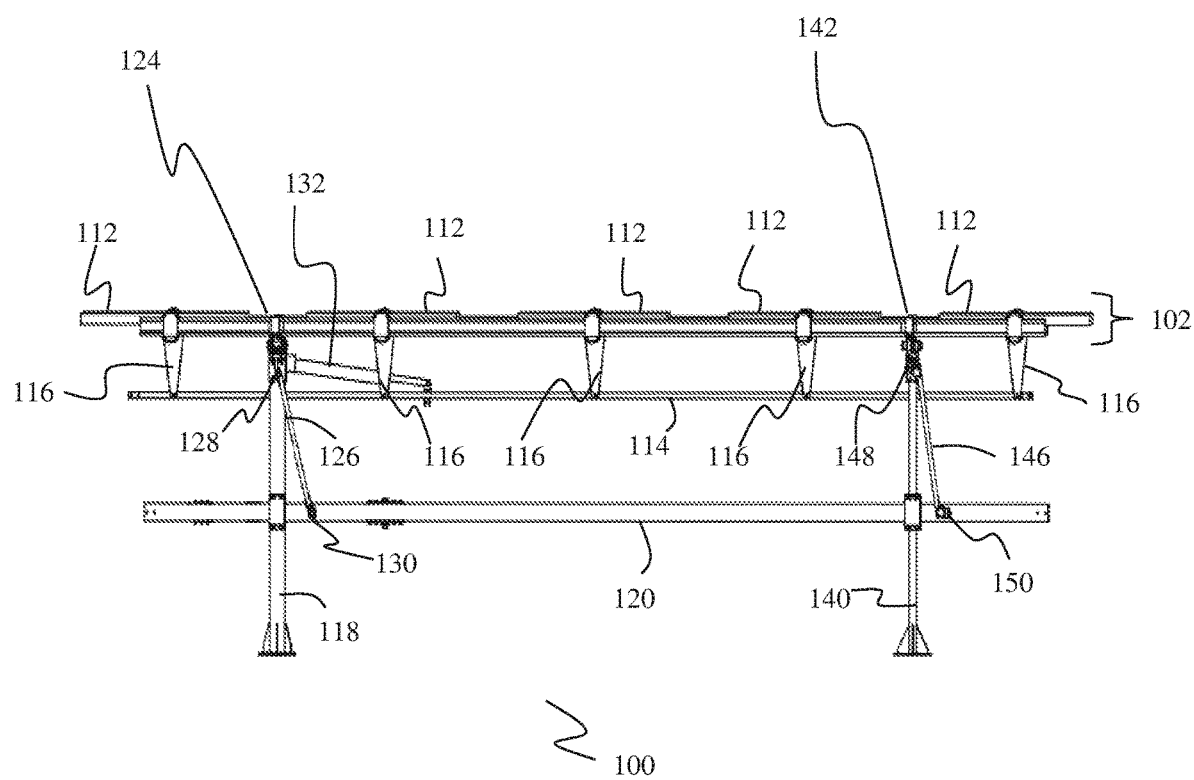
FIG. 2 illustrates a front view of the present invention.

FIG. 2 illustrates front view of the system (100). The front view of system (100) includes a frame (102), a PV module (112), an upper beam (114), a selectively flexible bracket (116), a first supporting pillar (118), a second supporting pillar (140), a lower beam (120), a first strut (126), a second strut (146) and an upper beam actuator (132). In front view of the system (100) the frame (102) includes a first cross beam (124) and a second cross beam (142). The PV module (112) is coupled to the frame (102) as shown in FIG. 1. The upper beam (114) is below to the frame side one (104). The selectively flexible bracket (116) is connected between the upper beam (114) and the frame side one bearing (108) (shown in FIG. 1). The lower beam (120) forms a perpendicular sliding pair with the first supporting pillar (118) and the second supporting pillar (140). The first Strut (126) is connected between the first cross beam (124) and the lower beam (120) through a first spherical joint (128) and a second spherical joint (130). The second strut (146) is connected between the second cross beam (142) and the lower beam (120) through a third spherical joint (148) and a fourth spherical joint (150). The upper beam actuator (132) is connected to the upper beam (114) at one end and further connected to the first cross beam (124) at the other end. The first spherical joint (128) connects one end of the first strut (126) and the first cross beam (124) and the second spherical joint (130) connects another opposite end of the first strut (126) and the lower beam (120). The third spherical joint (148) connects one end of the second strut (146) and the second cross beam (142) and the fourth spherical joint (150) connects another opposite end of the second strut (146) and the lower beam (120).

Figure 3:
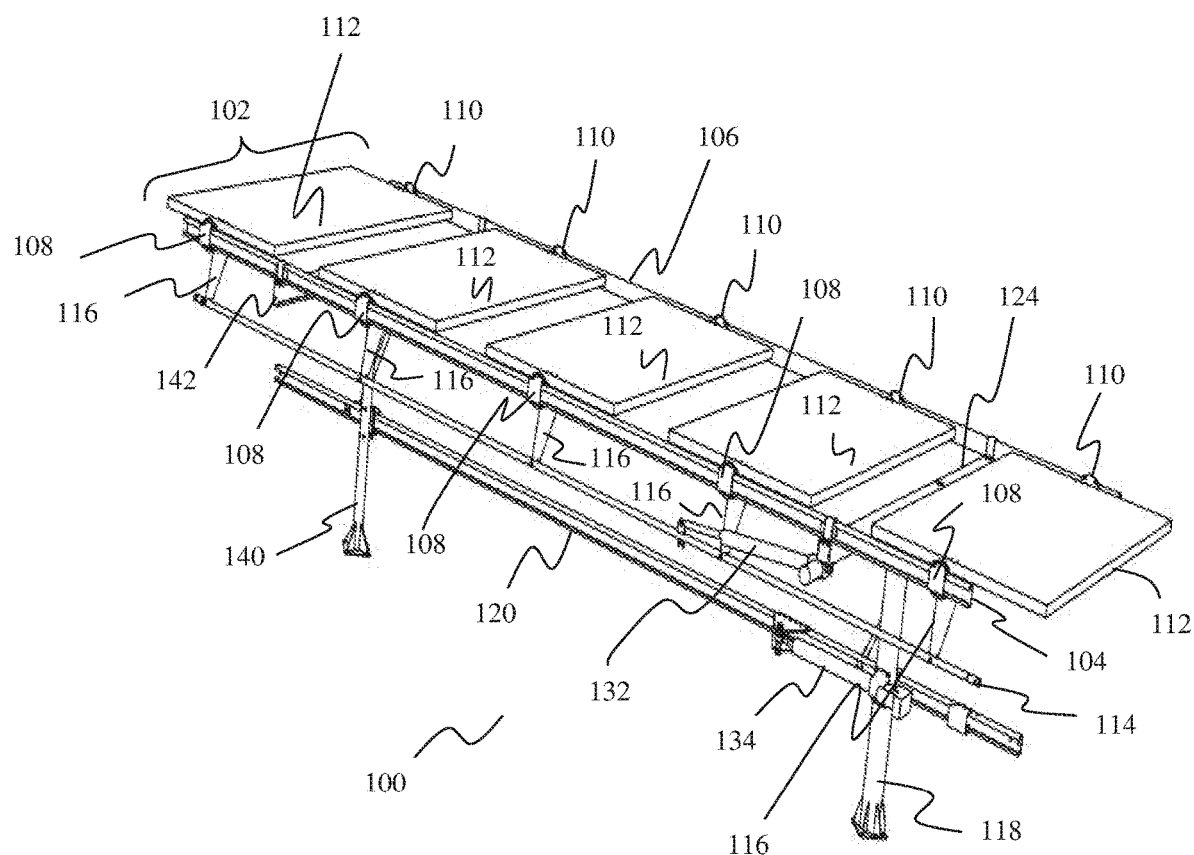
FIG. 3 illustrates isometric view of the present invention.

FIG. 3 illustrates isometric view of the system (100). The isometric view of system (100) includes a frame (102), a PV module (112), an upper beam (114), a selectively flexible bracket (116), a first supporting pillar (118), a second supporting pillar (140), a lower beam (120), an upper beam actuator (132) and a lower beam actuator (134). In isometric view of the system (100) the frame (102) includes a frame side one (104), a frame side two (106), a first cross beam (124), a second cross beam (142). The frame side two (106) is parallel to the frame side one (104). The first cross beam (124) is connected between the frame side two (106) and the frame side one (104) perpendicularly. The frame side one bearing (108) is connected to the frame side one (104). The frame side two bearing (110) is connected to the frame side two (106) exactly opposite to the frame side one bearing (108). The PV module (112) is coupled to the frame side one bearing (108) on the frame side one (104) and further coupled to the frame side two bearing (110) on the frame side two (106). The upper beam (114) is below to the frame side one (104). The selectively flexible bracket (116) is connected between the upper beam (114) and the frame side one bearing (108). The lower beam (120) forms a perpendicular sliding pair with the first supporting pillar (118) and the second supporting pillar (140). The first supporting pillar bearing (122) (shown in FIG. 1) is connected between the first supporting pillar (118) and the first cross beam (124). The second supporting pillar bearing (144) (shown in FIG. 1) is connected between the second supporting pillar (140) and the second cross beam (142). The lower beam actuator (134) is connected to the lower beam (120) at one end and connected to the first supporting pillar (118) at the other end.

Figure 4:
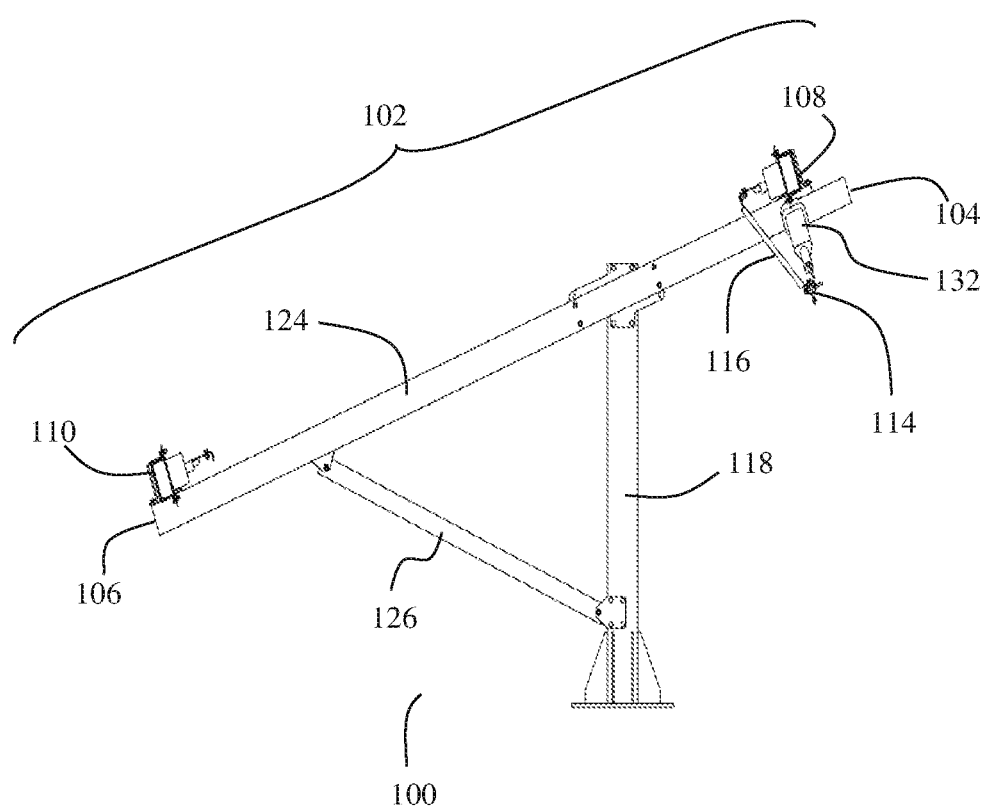
FIG. 4 illustrates a side view of an embodiment of the present invention with fixed north-south rotation angle.

FIG. 4 illustrate an side view of an embodiment of the system (100) with fixed north-south rotation angle. The system (100) includes a frame (102), a frame side one bearing (108), a frame side two bearing (110), an upper beam (114), a selectively flexible bracket (116), a first supporting pillar (118), a first strut (126). The frame (102) having a frame side one (104), a frame side two (106) and a first cross beam (124). The frame side two (106) is parallel to the frame side one (104). The first cross beam (124) is connected between the frame side two (106) and the frame side one (104) perpendicularly. The frame side one bearing (108) is connected to the frame side one (104). The frame side two bearing (110) is connected to the frame side two (106) exactly opposite to the frame side one bearing (108). The upper beam (114) is below to the frame side one (104). The upper beam actuator (132) is connected to the upper beam (114) at one end and connected to the first cross beam (124) at the other end. The selectively flexible bracket (116) is connected between the upper beam (114) and the at the frame side one bearing (108). The first strut (126) is connected between the first cross beam (124) and the first supporting pillar (118) through hinge joint.

The present invention relates to a two axis solar tracker system. The present invention includes a frame, a frame side one bearing, a frame side two bearing, a PV module, an upper beam, a selectively flexible bracket, a first supporting pillar, a second supporting pillar, a lower beam, a first supporting pillar bearing, a second supporting pillar bearing, a first strut, a second strut, an upper beam actuator and a lower beam actuator. The frame includes a frame side one, a frame side two, a first cross beam, and a second cross beam. The frame side two is parallel to the frame side one. The first cross beam is connected between the frame side two and the frame side one perpendicularly. The second cross beam is connected between the frame side two and the frame side one, and is parallel to the first cross beam. The frame side one bearing is connected to the frame side one. The frame side two bearing is connected to the frame side two exactly opposite to the frame side one bearing. The PV module is coupled to the frame side one bearing on the frame side one and further coupled to the frame side two bearing on the frame side two. The upper beam is below to the frame side one. The selectively flexible bracket is connected between the upper beam and the frame side one bearing. Herein, translation motion of the upper beam is along the length of frame side one. Herein, the plane of rotation of the frame side one bearing and the frame side two bearing is parallel to translation motion of the upper beam. Thus the PV module rotates in east-west direction through the upper beam. The lower beam forms a perpendicular sliding pair with the first supporting pillar and the second supporting pillar. Herein, translation motion of the lower beam is along the length of the frame side two. The first supporting pillar bearing is connected between the first supporting pillar and the first cross beam. The second supporting pillar bearing is connected between the second supporting pillar and the second cross beam. Herein, the plane of rotation of the first supporting pillar bearing and the second supporting pillar bearing is perpendicular to translation motion of the lower beam. The first Strut is connected between the first cross beam and the lower beam through a first spherical joint and a second spherical joint. The second strut is connected between the second cross beam and the lower beam through a third spherical joint and a fourth spherical joint. Herein, the first spherical joint connects one end of the first strut and the first cross beam and the second spherical joint connects another opposite end of the first strut and the lower beam. Herein, the third spherical joint connects one end of the second strut and the second cross beam and the fourth spherical joint connects another opposite end of the second strut and the lower beam. The upper beam actuator is connected to the upper beam at one end and further connected to the first cross beam at the other end. The lower beam actuator is connected to the lower beam at one end and connected to the first supporting pillar at the other end. The present invention is a four-bar linkage mechanism, such that the first supporting pillar and the second supporting pillar together act as the fixed link. The frame acts as the rotating link and the lower beam acts as the translating link. The first strut and the second strut together act as the fourth link connecting the frame and the lower beam. The translation of the lower beam causes rotation of the frame in north-south direction. The PV module is mounted on the frame are rotated in east-west direction by the upper beam. In an embodiment, the upper beam actuator and the lower beam actuator includes, but not limited to, a pneumatic drive, a pneumatic motor, a hydraulic drive, a hydraulic motor, and an electric motor. In the preferred embodiment, the upper beam actuator and the lower beam actuator include the electric motor. In the preferred embodiment, the frame is able to be rotated in north-south direction with respect to horizontal with large angle range. In an embodiment, multiple units of the system are able to be arranged in a row and the rotation of the frame is able to be control through the single lower beam actuator. In an embodiment, multiple units of the PV module are able to rotate in east-west direction through the single upper beam actuator. In the preferred embodiment, the upper beam actuator and the lower beam actuator are controlled by a programmed microcontroller unit.

In an embodiment, the present invention relates to a two axis solar tracker system. The present invention includes a frame, one or more frame side one bearings, one or more frame side two bearings, one or more PV modules, an upper beam, one or more selectively flexible brackets, one or more first supporting pillars, one or more second supporting pillars, a lower beam, one or more first supporting pillar bearings, one or more second supporting pillar bearings, one or more first struts, one or more second struts, a upper beam actuator and a lower beam actuator. The frame includes a frame side one, a frame side two, a first cross beam, and a second cross beam. The frame side two is parallel to the frame side one. The first cross beam is connected between the frame side two and the frame side one perpendicularly. The second cross beam is connected between the frame side two and the frame side one, and is parallel to the first cross beam. The one or more frame side one bearings are connected to the frame side one. The one or more frame side two bearings are connected to the frame side two exactly opposite to the one or more frame side one bearings. The one or more PV modules are coupled to the one or more frame side one bearings on the frame side one and further coupled to the one or more frame side two bearings on the frame side two. The upper beam is below to the frame side one. The one or more selectively flexible brackets are connected between the upper beam and the one or more frame side one bearings. Herein, translation motion of the upper beam is along the length of frame side one. Herein, the plane of rotation of the one or more frame side one bearings and the one or more frame side two bearings are parallel to translation motion of the upper beam. Thus the one or more PV modules rotate in east-west direction through the upper beam. The lower beam forms a perpendicular sliding pair with the one or more first supporting pillars and the one or more second supporting pillars. Herein, translation motion of the lower beam is along the length of frame side two. The one or more first supporting pillar bearings are connected between the one or more first supporting pillars and the first cross beam. The one or more second supporting pillar bearings are connected between the one or more second supporting pillars and the second cross beam. Herein, the plane of rotation of the one or more first supporting pillar bearings and the one or more second supporting pillar bearings are perpendicular to translation motion of the lower beam. The one or more first struts are connected between the first cross beam and the lower beam through one or more first spherical joints and one or more second spherical joints. The one or more second struts are connected between the second cross beam and the lower beam through one or more third spherical joints and one or more fourth spherical joints. Herein, the one or more first spherical joints connect one end of the one or more first struts and the first cross beam. The one or more second spherical joints connect another opposite end of the one or more first struts and the lower beam. Herein, the one or more third spherical joints connect one end of the one or more second struts and the second cross beam. The one or more fourth spherical joints connect another opposite end of the one or more second struts and the lower beam. The upper beam actuator is connected to the upper beam at one end and further connected to the first cross beam at the other end. The lower beam actuator is connected to the lower beam at one end and connected to the one or more first supporting pillars at the other end. The present invention is a four-bar linkage mechanism, such that the one or more first supporting pillars and the one or more second supporting pillars together act as the fixed link. The frame acts as the rotating link and the lower beam acts as the translating link. The one or more first struts and the one or more second struts together act as the fourth link connecting the frame and the lower beam. The translation of the lower beam causes rotation of the frame in north-south direction. The PV module is mounted on the frame are rotated in east-west direction by the upper beam. In an embodiment, the upper beam actuator and the lower beam actuator includes, but not limited to, a pneumatic drive, a pneumatic motor, a hydraulic drive, a hydraulic motor, and an electric motor. In the preferred embodiment, the upper beam actuator and the lower beam actuator include the electric motor. In the preferred embodiment, the frame is able to be rotated in north-south direction with respect to horizontal with large angle range. In an embodiment, multiple units of the system are able to be arranged in a row and the rotation of the frame is able to be control through the single lower beam actuator. In an embodiment, herein multiple units of the one or more PV modules are able to rotate in east-west direction through the single upper beam actuator. In the preferred embodiment, the upper beam actuator and the lower beam actuator are controlled by a programmed microcontroller unit.

In an embodiment, the present invention relates to a method of two axis solar tracker system, the method includes:
a method of rotating the PV module, the method having
force is applied on an upper beam in the direction along the length of a frame side one;
the upper beam moves in the direction of applied force;
the force from the upper beam transfers to a selectively flexible bracket;
the selectively flexible bracket moves to transfer the force applied to a frame side one bearing;
the frame side one bearing uses the force applied to rotate; and
rotation of the frame side one bearing rotates a PV module;
herein, force is applied on the upper beam is through the upper beam actuator.
a method of rotating the frame, the method having
force is applied on a lower beam in the direction parallel to a frame side two;
the lower beam moves in the direction of the force applied;
the force from lower beam transfers to a first strut and a second strut;
the position of a first strut and the second strut is adjusted by the force applied with the help of a first spherical joint, a second spherical joint, a third spherical joint and a fourth spherical joint;
the force from the first strut and the second strut is transferred to the frame; and
the angle of rotation of the frame is changed depending on the force applied;
herein force is applied on the lower beam is through a lower beam actuator.

In an embodiment, the position of the frame is locked in position by a method of locking the frame movement, the method includes:
the frame is held in a position perpendicular to a first supporting pillar and a second supporting pillar;
the unwanted forces on the frame are balanced by the first strut and the second strut hence locking the position of the frame;
in case the frame is not perpendicular to the first supporting pillar and the second supporting pillar, the frame is moved to position perpendicular to the first supporting pillar and the second supporting pillar through applied force to be in locked in position; and
in case of moving the frame, a method of rotating the frame is executed;
herein, applied force to be in locked in position is through the lower beam actuator.

In an embodiment, the present invention relates to a method of dual axis solar tracker system, the method includes:
a method of rotating the one or more PV modules, the method having
force is applied on an upper beam in the direction along the length of a frame side one;
the upper beam moves in the direction of applied force;
the force from the upper beam transfers to one or more selectively flexible brackets;
the one or more selectively flexible brackets move to transfer the force applied to a one or more frame side one bearings;
the one or more frame side one bearings use the force applied to rotate; and
rotations of the one or more frame side one bearings rotate one or more PV modules;
herein the force is applied on the upper beam is through the upper beam actuator.
a method of rotating the frame, the method having
force is applied on a lower beam in the direction parallel to a frame side two;
the lower beam moves in the direction of the force applied;
the force from lower beam transfers to one or more first struts and one or more second struts;
the position of the one or more first struts and the one or more second struts are adjusted by the force applied with the help of one or more first spherical joints, one or more second spherical joints, one or more third spherical joints and one or more fourth spherical joints;
the force from the one or more first struts and the one or more second struts is transferred to the frame; and
the angle of rotation of frame is changed depending on the force applied;
herein, force is applied on the lower beam is through a lower beam actuator.

In an embodiment, the position of the frame is locked in position by a method of locking the frame movement, the method includes:
the frame is held in a position perpendicular to one or more first supporting pillars and one or more second supporting pillars;
the unwanted forces on the frame are balanced by the one or more first struts and the one or more second struts hence locking the position of the frame;
in case the frame is not perpendicular to the one or more first supporting pillars and the one or more second supporting pillars, the frame is moved to position perpendicular to the one or more first supporting pillars and the one or more second supporting pillars through applied force to be in locked in position; and
in case of moving the frame, a method of rotating the frame is executed;
herein, the applied force to be in locked in position is through the lower beam actuator.

In yet another embodiment, the present invention includes a frame, a frame side one bearing, a frame side two bearing, a PV module, an upper beam, a selectively flexible bracket, a first supporting pillar, a second supporting pillar, a first strut, a second strut, an upper beam actuator. The frame includes a frame side one, a frame side two, a first cross beam, and a second cross beam. The frame side two is parallel to the frame side one. The first cross beam is connected between the frame side two and the frame side one perpendicularly. The second cross beam is connected between the frame side two and the frame side one, and is parallel to the first beam. The frame side one bearing is connected to the frame side one. The frame side two bearing is connected to the frame side two exactly opposite to the frame side one bearing. The PV module is coupled to the frame side one bearing on the frame side one and further coupled to the frame side two bearing on the frame side two. The upper beam is below to the frame side one. The selectively flexible bracket is connected between the upper beam and the frame side one bearing. Herein, translation motion of the upper beam is along the length of frame side one. Herein, the plane of rotation of the frame side one bearing and the frame side two bearing is parallel to translation motion of the upper beam. Thus the PV module rotates in east-west direction through the upper beam. The top of the first supporting pillar is connected to the first cross beam through hinge joint. The top of the second supporting pillar is connected to the second cross beam through hinge joint. The first strut is connected between the first cross beam and the first supporting pillar through hinge joint. The second strut is connected between the second cross beam and the second supporting pillar through hinge joint. Herein, one end of the first strut is connected to the first cross beam through hinge joint and another opposite end of the first strut is connected to the first supporting pillar through hinge joint. Herein, one end of the second strut is connected to the second cross beam through hinge joint and another opposite end of the second strut is connected to the second supporting pillar through hinge joint. The upper beam actuator is connected to the upper beam at one end and connected to the first cross beam at the other end. Herein, translation motion of the upper beam is along the length of frame side one. Herein, the selectively flexible bracket is designed to transmit rotation. Herein, position of the frame is fixed by restricting the rotation of the frame in North-South direction.

Further objectives, advantages and features of the present invention will become apparent from the detailed description provided herein below, in which various embodiments of the disclosed present invention are illustrated by way of example and appropriate reference to accompanying drawings. Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

The invention claimed is:

1. A dual axis solar tracker system (100), the system (100) comprising:
    a frame (102), the frame (102) having a frame side one (104),
        a frame side two (106), the frame side two (106) is parallel to the frame side one (104),
        a first cross beam (124), the first crossbeam (124) is connected between the frame side two (106) and the frame side one (104) perpendicularly, and
        a second cross beam (142), the second cross beam (142) is connected between the frame side two (106) and the frame side one (104), and is parallel to the first beam (124), and
    an at least one frame side one bearing (108), the at least one frame side one bearing (108) is connected to the frame side one (104);
    an at least one frame side two bearing (110), the at least one frame side two bearing (110) is connected to the frame side two (106) exactly opposite to the at least one frame side one bearing (108);
    an at least one solar panel (112), the at least one solar panel (112) is coupled to the at least one frame side one bearing (108) on the frame side one (104) and further coupled to the at least one frame side two bearing (110) on the frame side two (106);
    an upper beam (114), the upper beam (114) is below to the frame side one (102);
    an at least one selectively flexible bracket (116), the at least one selectively flexible bracket (116) is connected between the upper beam (114) and the at least one frame side one bearing (108);
    an at least one first supporting pillar (118);
    an at least one second supporting pillar (140);
    a lower beam (120), the lower beam (120) forms a perpendicular sliding pair with the at least one first supporting pillar (118) and the at least one second supporting (140);
    an at least one first supporting pillar bearing (122), the at least one first supporting pillar bearing (122) is connected between the at least one first supporting pillar (118) and the first cross beam (124);
    an at least one second supporting pillar bearing (144), the at least one second supporting pillar bearing (144) is connected between the at least one second supporting pillar (140) and the second cross beam (142);
    an at least one first strut (126), the at least one first strut (126) is connected between the first cross beam (124) and the lower beam (120) through an at least one first spherical joint (128) and an at least one second spherical joint (130);
    an at least one second strut (146), the at least one second strut (146) is connected between the second cross beam (142) and the lower beam (120) through an at least one third spherical joint (148) and an at least one fourth spherical joint (150);
    an upper beam actuator (132), the upper beam actuator (132) is connected to the upper beam (114) at one end and further connected to the first cross beam (124) at the other end; and
    a lower beam actuator (134), the lower beam actuator (134) is connected to the lower beam (120) at one end and connected to the at least one first supporting pillar (118) at the other end;
    wherein, translation motion of the upper beam (114) is along the length of frame side one (104),
    wherein, the plane of rotation of the at least one frame side one bearing (108) and the at least one frame side two bearing (110) is parallel to translation motion of the upper beam (114),
    wherein, translation motion of the lower beam (120) is along the length of frame side two (106),
    wherein, the plane of rotation of the first supporting pillar bearing (122) and the second supporting pillar bearing (144) is perpendicular to translation motion of the lower beam (120),
    wherein, the at least one first spherical joint (128) connects one end of the at least one first strut (126) and the first cross beam (124) and the at least one second spherical joint (130) connects another opposite end of the at least one first strut (126) and the lower beam (120),
    wherein, the at least one third spherical joint (148) connects one end of the at least one second strut (146) and the second cross beam (142) and the at least one fourth spherical joint (150) connects another opposite end of the at least one second strut (126) and the lower beam (120), wherein, the system (100) is a four-bar linkage mechanism, such that the at least one first supporting pillar (118) and the at least one second supporting pillar (140) together act as the fixed link, the frame (102) acts as the rotating link and the lower beam (120) acts as the translating link and the at least one first strut (126) and the at least one second strut (126) together act as the fourth link connecting the frame (102) and the lower beam (120) and thus in the designed configuration, the translation of the lower beam (120) causes rotation of the frame (102).

2. The system (100) as claimed in claim 1, wherein the upper beam actuator (132) and the lower beam actuator (134) are selected from a pneumatic drive, a pneumatic motor, a hydraulic drive, a hydraulic motor and an electric motor.

3. The frame (102) as claimed in claim 1, wherein the frame (102) is able to be rotated in north-south direction with respect to horizontal with a large angle range.

4. The system (100) as claimed in claim 1, wherein, multiple units of the system (100) are able to be arranged in a row and the rotation of the frame (102) is able to be control through the single lower beam actuator (134).

5. The system (100) as claimed in claim 1, wherein multiple units of the at least one solar panel (112) are able to rotated in east-west direction through the single upper beam actuator (132).

6. The system (100) as claimed in claim 1, wherein the upper beam actuator (132) and the lower beam actuator (134) are controlled by an electronic control system.

7. A dual axis solar tracker system (100), the system (100) comprising:
a frame (102), the frame (102) having
a frame side one (104),
a frame side two (106), the frame side two (106) is parallel to the frame side one (104),
a first cross beam (124), the at least one first cross second beam (124) is connected between the frame side two (106) and the frame side one (104) perpendicularly, and
a second cross beam (142), the second cross beam (142) is connected between the frame side two (106) and the frame side one (104), and is parallel to the at least one first cross second beam (124);
an at least one frame side one bearing (108), the at least one frame side one bearing (108) is connected to the frame side one (104);
an at least one frame side two bearing (110), the at least one frame side two bearing (110) is connected to the frame side two (106) exactly opposite to the at least one frame side one bearing (108);
an at least one solar panel (112), the at least one solar panel (112) is coupled to the at least one frame side one bearing (108) on the frame side one (104) and further attached to the at least one frame side two bearing (110) on the frame side two (106);
an upper beam (114), the upper beam (114) is below to the frame side one (102);
an at least one selectively flexible bracket (116), the at least one selectively flexible bracket (116) is connected between the upper beam (114) and the at the at least one frame side one bearing (108);
a first supporting pillar (118), top of the at least one first supporting pillar (118) is connected to the at least one first cross second beam (124) through a hinge joint;
an at least one second supporting pillar (140), top of the at least one second supporting pillar (140) is connected to the at least one second cross beam (142) through a hinge joint;
an at least one first strut (126), the at least one first strut (126) is connected between the first cross beam (124) and the at least one first supporting pillar (118) through a hinge joint;
an at least one second strut (146), the at least one second strut (146) is connected between the at least one second cross beam (142) and the at least one second supporting pillar (140) through a hinge joint;
an upper beam actuator (132), the upper beam actuator (132) is connected to the upper beam (114) at one end and connected to the first cross beam (124) at the other end; and
wherein, translation motion of the upper beam (114) is along the length of frame side one (104),
wherein, the plane of rotation of the at least one frame side one bearing (108) and the at least one frame side two bearing (110) is parallel to translation motion of the upper beam (114),
wherein, one end of the at least one first strut (126) is connected to the first cross beam (124) through a hinge joint and another opposite end of the at least one first strut (126) is connected to the at least one first supporting pillar (118) through a hinge joint,
wherein, one end of the at least one second strut (146) is connected to the at least one second cross beam (142) through a hinge joint and another opposite end of the at least one second strut (126) is connected to at least one second supporting pillar (140) through a hinge joint,
wherein, the at least one selectively flexible bracket (116) is designed to transmit rotation,
wherein, position of the frame (102) is fixed by restricting the rotation of the frame (102) in North-South direction.

8. A method of dual axis solar tracker system (100), the method comprising:
a method of rotating the at least one solar panel (112), the step of providing a frame (102), the method having
force applied on an upper beam (114) in the direction along the length of a frame side one (104);
the upper beam (114) moves in the direction of applied force;
the force from the upper beam (114) transfers to an at least one selectively flexible bracket (116);
the at least one selectively flexible bracket (116) moves to transfer the force applied to an at least one frame side one bearing (108);
the at least one frame side one bearing (108) uses the force applied to rotate; and
rotation of the at least one frame side one bearing (108) rotates an at least one solar panel (112);
wherein force is applied on the upper beam (114) through an upper beam actuator (132),
a method of rotating the frame (102), the method having
force is applied on a lower beam (120) in the direction parallel to a frame side two (106);
the lower beam (120) moves in the direction of the force applied;
the force from the lower beam (120) transfers to an at least one first strut (126) and an at least one second strut (146);
the position of the at least one first strut (126) and the at least one second strut (146) is adjusted by the force applied with the help of an at least one first spherical joint (128), an at least one second spherical joint (130), an at least one third spherical joint (148) and an at least one fourth spherical joint (150);

the force from the at least one first strut (126) and the at least one second strut (146) is transferred to the frame (102); and the angle of rotation of a frame (102) is changed depending on the force applied;

wherein, force is applied on the lower beam (120) through a lower beam actuator (134).

9. The method as claimed in claim 8, the position of the frame (102) is locked in position by a method of locking the frame (102) movement, the method comprising:

the frame (102) is held in a position perpendicular to the at least one first supporting pillar (118) and the at least one second supporting pillar (140);

the unwanted forces on the frame (102) are balanced by the at least one first strut (126) and the at least one second strut (146) hence locking the position of the frame (102);

in case the frame (102) is not perpendicular to the at least one first supporting pillar (118) and the at least one second supporting pillar (140), the frame (102) is moved to position perpendicular to the at least one first supporting pillar (118) and the at least one second supporting pillar (140) through applied force to be locked in position; and in case of moving the frame (102), a method of rotating the frame (102) is executed;

wherein, the applied force to be locked in position is through the lower beam actuator (134).

\* \* \* \* \*